United States Patent [19]
Schroeder

[11] Patent Number: 5,835,869
[45] Date of Patent: *Nov. 10, 1998

[54] DUAL-CONTROL SCHEME FOR IMPROVED MISSILE MANEUVERABILITY

[75] Inventor: Wayne K. Schroeder, Arlington, Tex.

[73] Assignee: Lockheed Martin Corporation, Bethesda, Md.

[ * ] Notice: The term of this patent shall not extend beyond the expiration date of Pat. No. 5,631,830.

[21] Appl. No.: 858,511

[22] Filed: May 19, 1997

Related U.S. Application Data

[63] Continuation of Ser. No. 383,720, Feb. 3, 1995, Pat. No. 5,631,830.
[51] Int. Cl.⁶ ............................................ G06F 19/00
[52] U.S. Cl. ............................ 701/4; 244/3.21; 244/3.22
[58] Field of Search ...................... 701/1, 3, 4; 244/3.21, 244/3.22, 3.1, 3.15, 176, 177

[56] References Cited

U.S. PATENT DOCUMENTS

| | | | |
|---|---|---|---|
| 4,867,393 | 9/1989 | Faupell et al. | 244/3.22 |
| 5,088,658 | 2/1992 | Forsmo | 244/3.21 |
| 5,094,406 | 3/1992 | Shafer | 244/3.21 |
| 5,259,569 | 11/1993 | Waymeyer et al. | 244/3.22 |
| 5,631,830 | 5/1997 | Schroeder | 701/4 |

Primary Examiner—Gary Chin
Attorney, Agent, or Firm—Arnold, White & Durkee

[57] ABSTRACT

A cooperative dual-control strategy actuates forward and aft control devices simultaneously to significantly improve a missile's maneuverability/dynamic capability. A substantial, and measurable, operational effect of the inventive control strategy is a dramatic improvement in a missile's divert capability. To effect a maneuver in accordance with the inventive strategy, a missile's aft fins are initially deflected to generate a force OPPOSITE that conventionally used (pushing the missile's tail in the direction of the commanded maneuver) while simultaneously actuating forward thrusters to also push the missile's nose in the direction of the commanded maneuver but at a faster rate than the tail section. This causes the missile body to simultaneously rotate and translate in the direction of the commanded maneuver. Once a sufficient amount of aerodynamic force develops due to body rotation, the aft fins are deflected to generate a force that opposes the commanded maneuver to maintain a moment on the missile body and complete the commanded maneuver. An important benefit of cooperative dual-control strategy is that the missile begins to translate in the direction of the commanded maneuver immediately (conventional isolated aft control schemes do not accomplish this) and at a faster rate than is possible with either isolated forward control devices or an intuitive dual-control approach.

16 Claims, 13 Drawing Sheets

DUAL-CONTROL SCHEME FOR IMPROVED MISSILE MANEUVERABILITY

This application is a continuation of Ser. No. 08/383,720, filed Feb. 3, 1995, now U.S. Pat. No. 5,631,830, issued May 20, 1997.

1. FIELD OF THE INVENTION

The invention relates in general to the field of maneuver control of a vehicle traveling through a fluid environment (e.g., air, water, plasma) and more particularly to a maneuver strategy implementing dual-control devices to improve vehicle maneuverability. Specifically, the invention describes a dual-control autopilot that allocates control commands to two control mechanisms (positioned forward and aft of a vehicle's center of gravity) in such a manner as to provide increased dynamic capability.

2. BACKGROUND OF THE INVENTION

An application which exhibits an immediate need for the improved maneuverability provided by this invention is an interceptor missile. Enemy offensive missiles pose an escalated challenge for interceptor missiles. Modem threat configurations are designed to realize reduced radar signatures, make use of expanded countermeasures, travel at extremely high velocities over unpredictable or difficult to predict trajectories, and employ large magnitude lateral evasive maneuvers. In order to accomplish body-to-body impact, the interceptor missile must achieve large transverse acceleration levels in a very short period of time to move the vehicle perpendicular to its flight path to ensure collision.

As shown in FIG. 1, a missile system can be described as an elongated body 100 that travels through a fluid medium. The missile 100 has a forward section and an aft section divided by a point of center of gravity 105. Forward of the center of gravity 105 is a forward control device such as thrusters 110. The aft section has an aft control device such as fins 115. It will be apparent to one of ordinary skill in the field that other alternative control devices are possible. For instance, the forward control device could be implemented as canards rather than as thrusters. Similarly, the aft control device could be implemented via thrust-vector control techniques.

FIG. 1 shows the vehicle configuration, sign convention, and notation used in this discussion for a body fixed coordinate system allowing motion in the x–z plane. Table 1 describes the notation introduced in FIG. 1.

TABLE 1

Notation

| Symbol | Description |
|---|---|
| x | longitudinal body fixed (right-hand) Cartesian coordinate |
| y | transverse body fixed (right-hand) Cartesian coordinate |
| z | transverse body fixed (right-hand) Cartesian coordinate |
| $N_z$ | transverse acceleration load factor along body axis z |
| q | missile pitch rate about body axis y |
| $U_o$ | longitudinal velocity along body axis x |
| w | transverse velocity along body axis z |
| $\delta_{fin}$ | aft fin deflection angle |
| $\delta_{thr}$ | magnitude of applied thrust force |

A missile moves in a transverse direction in response to an applied control force according to the laws of physics. Below the altitude of approximately 20 kilometers, a missile's primary source of transverse acceleration is the aerodynamic force resulting from the missile body being at an angle with its velocity vector (angle of attack). Flight control devices (e.g., forward thrusters 110 and/or aft fins 115) obtain this angle of attack by applying a moment to rotate the missile's front end in the direction of the intended maneuver.

A functional block diagram of a conventional missile control system is shown in FIG. 2. Block 200 represents the physical vehicle (i.e., the missile) and incorporates all vehicle subsystems including, for example, control actuation, propulsion and inertial measurement systems as well as aerodynamic configuration. The vehicle's measured dynamic response is shown as feedback signal 205. This signal encodes, for example, a measurement of the missile's 100 rotational and translational rates and accelerations. The missile guidance logic shown in block 210 provides a commanded dynamic response signal 215 which encodes a desired maneuver along a kinematic trajectory. The difference between the desired and measured responses produce the error signal 220 in a conventional feedback architecture. The autopilot controller 225 uses the error signal to generate a control signal 230. This control signal encodes commands to actuate the vehicle's control devices. For example, the control signal 230 could be degrees of deflection of a fin or canard, or degrees of deflection of a rocket motor nozzle, or percentage of maximum thrust of an attitude control motor, etc.

2.1 Forward Control Device Systems

One type of conventional missile control system employs a forward control device only. An example of this type of missile system is the FLAGE missile designed by LTV Aerospace Corporation (now Loral Vought Systems, the assignee of this application). The FLAGE missile employs active control of forward thrusters to achieve maneuverability. In the FLAGE missile, aft fins are fastened in a fixed canted position to provide stabilization and rolling characteristics.

A conventional control scheme employing a forward control device (e.g., thrusters) only is shown in FIGS. 3A through 3C. In response to a command signal 300 (corresponding to command signal 215) from the guidance system 210 for a desired step increase in lateral acceleration in the positive z-direction, the missile's autopilot controller 225 generates a time varying thruster command signal 305 (corresponding to control signal 230) to effect the maneuver. Actuation of the lateral control thrusters produce the measured acceleration response 310 in the positive z-direction normal to the vehicle's body. It is conventional to illustrate the acceleration by normalizing with the missile's weight producing a load factor $N_z$ having the units of g-force.

At time $t_0$ guidance system output (215 and 300) commands a step increase in positive z-axis acceleration. Referring to signals 305 and 310, between times $t_0$ and $t_1$ the autopilot controller 225 commands the forward thrusters to deliver a force 305 in the positive z-direction to rotate the missile's nose in the positive z-irection 310 (also known as a negative pitching moment). Between times $t_1$ and $t_2$, the autopilot controller commands the thrusters to deliver a negative force 305 to slow the missile's downward rotation. After time $t_2$, the autopilot controller commands a positive force 305 to hold a steady rate and acceleration in the positive z-direction 310. (Note, one skilled in the art will realize that this description also applies to accelerations in other directions.)

It is important to note that forward control mechanisms achieve missile rotation by applying a force in the direction of the maneuver, that is, ALL missile acceleration 310 is in the direction of the maneuver.

2.2 Aft Control Device Systems

Another conventional missile control technique employs an aft control device only. Examples include the Patriot missile system (Raytheon), VT-1 missile system (Loral Vought Systems) and the ATACMS missile system (Loral Vought Systems). In these systems, active control of the aft flight control surfaces (fins or thrusters) are employed to achieve maneuverability.

A conventional control scheme employing an aft control device (fins) only is shown in FIGS. 4A through 4C. In response to a command signal 300 (corresponding to command signal 215) from the guidance control system 210 for a step increase in acceleration in the positive z-direction, the missile's autopilot controller 225 generates a fin control signal 400 (corresponding to the control signal 230) to effect the maneuver. Signal trace 405 represents the missile's measured transverse acceleration response $N_z$ from the missile's inertial measurement system (corresponding to the feedback signal 205), where $N_z$ is described above with respect to FIGS. 3A through 3C.

At time to guidance system output (215 and 300) commands a step increase in positive z-axis acceleration. Between times $t_0$ and $t_1$ the autopilot controller 225 sends a command signal 400 (corresponding to control signal 230) to actuate the missile's aft fins to deflect in a direction opposite the desired maneuver (sign convention denotes this as a positive deflection, refer to FIG. 1), producing an aerodynamic force on the fin surfaces in the negative z-direction. This force on the fins momentarily accelerates the missile's body in a direction opposite the commanded maneuver, thus introducing an inherent delay in the maneuver. Rotation of the missile's aft end causes the missile nose to pitch downward and the missile body to eventually accelerate in the positive z-direction. Between times $t_1$ and $t_2$, the autopilot controller 225 commands the aft fins to deflect in the same rotational direction as the maneuver, producing a fin force in the direction of the maneuver and causing the missile rotation to slow. After time $t_2$, the autopilot controller commands a fin deflection in a direction opposite the maneuver, producing an opposing force and a rotation in the direction of the maneuver to maintain a steady rate and transverse acceleration in the positive z-direction. (Note, one skilled in the art will realize that this description also applies to accelerations in other directions.)

It is important to note that aft control mechanisms achieve missile accelerations by applying a force, initially, in the direction OPPOSITE the maneuver, see 410, which causes an inherent delay in the missile's response to the commanded maneuver, see 405.

2.3 Dual-Control Device Systems

The amount of control authority available to the missile is, in general, bounded by the length and diameter dimensions of the missile's airframe 100. Putting two control devices—dual-control strategy—on a single missile increases the amount of control moment which can be applied to the vehicle and, therefore, enlarges the missile's potential for increased maneuverability.

While some conventional missile control systems, such as the PAC-3 (Loral Vought Systems), employ both forward and aft control devices, they do not employ them in a cooperative manner for planar maneuvers. That is, the forward control device may be used to control the vehicle's pitch maneuver, while the aft control device may be used simultaneously to control the vehicle's roll motion.

A functional block diagram of an autopilot control system employing the dual-control concept is shown in FIG. 5. Block 200 represents the physical vehicle, including all vehicle subsystems such as control actuation, propulsion and inertial measurement systems. Output from the inertial measurement system (encoding, for instance, measured system roll, pitch and yaw rates and transverse accelerations) is shown as feedback signal 205. Measured vehicle response 205 is compared with a commanded dynamic response signal 215 from the guidance control system 210 to create an error signal 220 in a conventional feedback architecture. The dual-control autopilot controller 500 uses the error signal 220 to generate a forward control signal 505 and an aft control signal 510. It is the missile control signals 505 and 510 that control the missile's forward and aft control devices such as thrusters 110 fins 115.

2.4 An Intuitive Approach to Improving Missile Maneuverability

Dual-control of competitive devices has not heretofore been used in a cooperative manner because it is a challenging control problem. The difficulty in implementing a dual-control strategy lies in being able to allocate how much of the desired maneuver should be the responsibility of each control mechanism. That is, how much should the forward control device be actuated and how much should the aft control device be actuated to effect the commanded dynamic response.

Since the maneuverability of the missile is obtained via application of moments by the fore and aft control devices, intuition suggests that the fastest response using a dual-control strategy should be obtained by having the two control devices apply the largest controllable moment couple. In other words, an intuitive approach to improving a missile's dynamic capability is to simply use the individual forward and aft control strategies—the same command shapes as shown in FIGS. 3A through 3C and 4A through 4C—but appropriately scaled. A control mechanism employing this approach is shown in FIGS. 6A through 6D. In response to a command signal 300 from the guidance control system 210 for a step increase in acceleration in the positive z-direction, the missile's autopilot controller 500 generates a thruster control signal (505 and 600) and a fin control signal (510 and 605) to effect the maneuver. Element 610 represents the missile's measured transverse acceleration response $N_z$ (corresponding to feedback signal 205) to the commanded maneuver, where $N_z$ is described above with respect to FIGS. 3A through 3C.

It is important to note that using this intuitive control strategy, the vehicle's acceleration in the commanded direction is delayed with respect to a isolated forward control strategy (compare 310 and 610). As previously noted, this delay is caused by the applied fin force being in a direction opposite that of the desired motion. It is recognized in the field that use of aft control devices introduce an inherent delay in missile response. Thus, the intuitive approach to improving a missile's dynamic capability using a dual-control strategy suggests that the command signals to fore and aft control devices be scaled in such a manner as to provide the desired acceleration.

3. SUMMARY OF THE INVENTION

A cooperative dual-control strategy actuates forward and aft control devices simultaneously to significantly improve a missile's maneuverability/dynamic capability. To effect a maneuver in accordance with the inventive strategy, a missile's aft fins are initially deflected to generate a force OPPOSITE that conventionally used (pushing the missile's tail in the direction of the commanded maneuver) while simultaneously actuating forward thrusters to also push the missile's nose in the direction of the commanded maneuver but at a faster rate than the tail section. This causes the missile body to simultaneously rotate and translate in the direction of the commanded maneuver. Once a sufficient amount of aerodynamic force develops due to body rotation, the aft fins are deflected to generate a force that opposes the commanded maneuver to maintain a moment on the missile body and complete the commanded maneuver. An important benefit of cooperative dual-control strategy is that the missile begins to translate in the direction of the commanded maneuver immediately (conventional isolated aft control schemes do not accomplish this) and at a faster rate than is possible with either isolated forward control devices or an intuitive dual-control approach. A key operational benefit of the invention is a dramatically improved missile divert capability.

It is as important distinction in the inventive control strategy that the aft fin control command, during the early portion of the maneuver, is in a direction OPPOSITE that conventionally used for the maneuver. (If the forward control system is unable to apply a significant enough moment, the fins may briefly be used to augment the thruster moment and then be used as a force generating device at low angles of attack). After this initial movement, the fins are deflected in a direction conventional for the maneuver. In cooperation with the aft fin control, forward thruster control is applied in the direction expected for the maneuver.

4. BRIEF DESCRIPTION OF DRAWINGS

5. DETAILED DESCRIPTION OF A SPECIFIC EMBODIMENT

One illustrative embodiment of the invention is described below as it might be implemented using a cooperative dual-control strategy. In the interest of clarity, not all features of an actual implementation are described in this specification. It will of course be appreciated that in the development of any such actual implementation (as in any control system development project, numerous implementation-specific decisions must be made to achieve the designer's specific goals, such as compliance with system- and business-related constraints, which will vary from one implementation to another. Moreover, it will be appreciated that such a development effort might be complex and time-consuming, but would nevertheless be a routine undertaking of a aerodynamic control systems engineer of ordinary skill having the benefit of this disclosure.

A portion of the disclosure (section 5.3) of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

5.1 Inventive Control Strategy

A dual-control strategy in accordance with the invention actuates forward and aft control devices simultaneously to significantly improve a missile's maneuverability/dynamic capability. To effect a maneuver in accordance with the invention a missile's aft fins are initially deflected to generate a force OPPOSITE that conventionally used (i.e., pushing the missile's tail in the direction of the commanded maneuver) while simultaneously actuating forward thrusters to also push the missile's nose in the direction of the commanded maneuver but at a faster rate than the tail section. This causes the missile body to simultaneously rotate and translate in the direction of the commanded maneuver. Once a sufficient amount of aerodynamic force develops due to body rotation, the aft fins are deflected to generate a force that opposes the commanded maneuver (i.e., as conventionally done) to maintain a moment on the missile body and complete the commanded maneuver. An important benefit of the inventive strategy is that the missile begins to translate in the direction of the commanded maneuver immediately (conventional isolated aft control schemes do not accomplish this) and at a faster rate than is possible with either isolated forward control devices or an intuitive dual-control approach as discussed above.

Figure 3A:
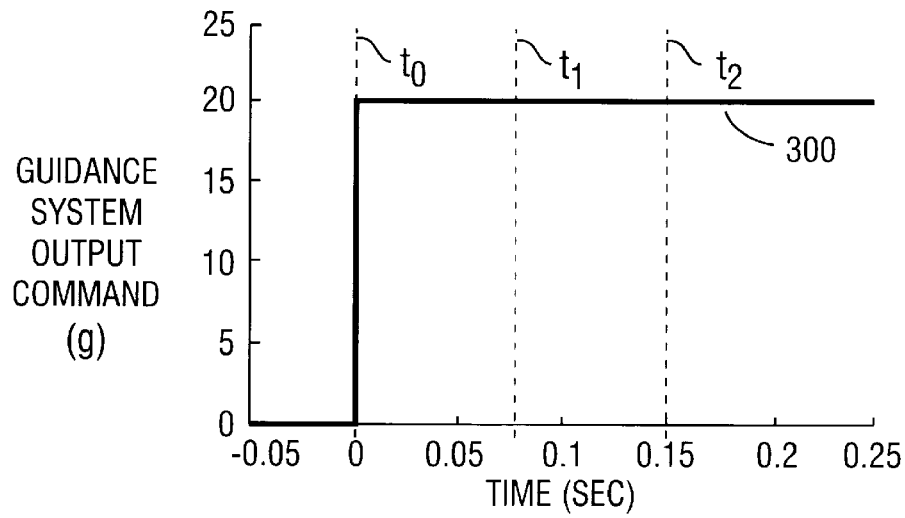
FIGS. 3A through 3C illustrates a conventional control scheme employing a forward (thruster) control device.
Figure 3B:
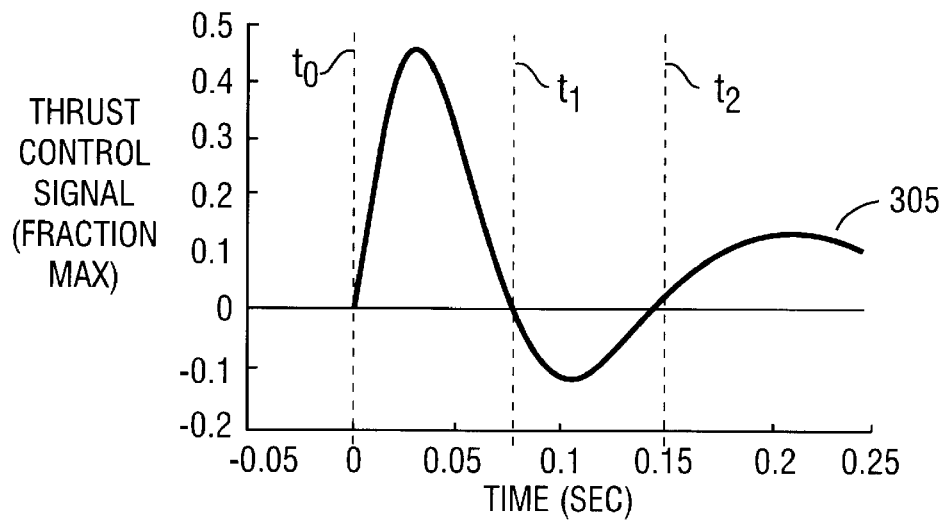
Figure 3C:
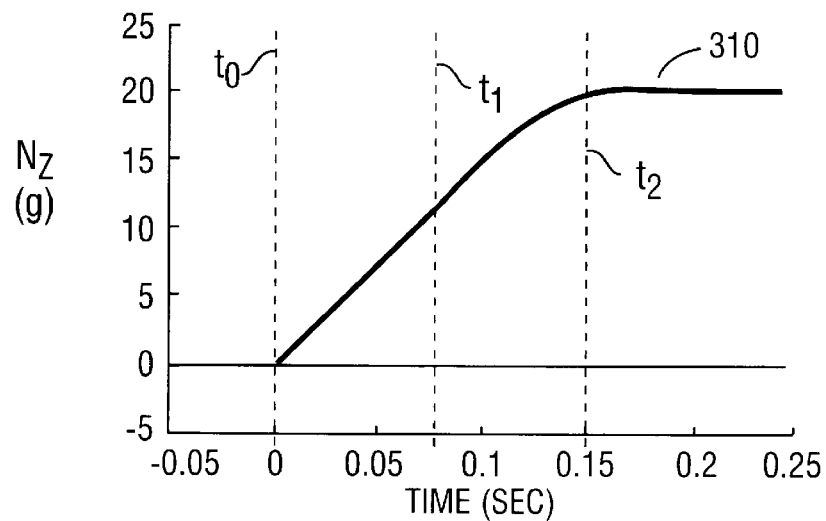
Figure 4A:
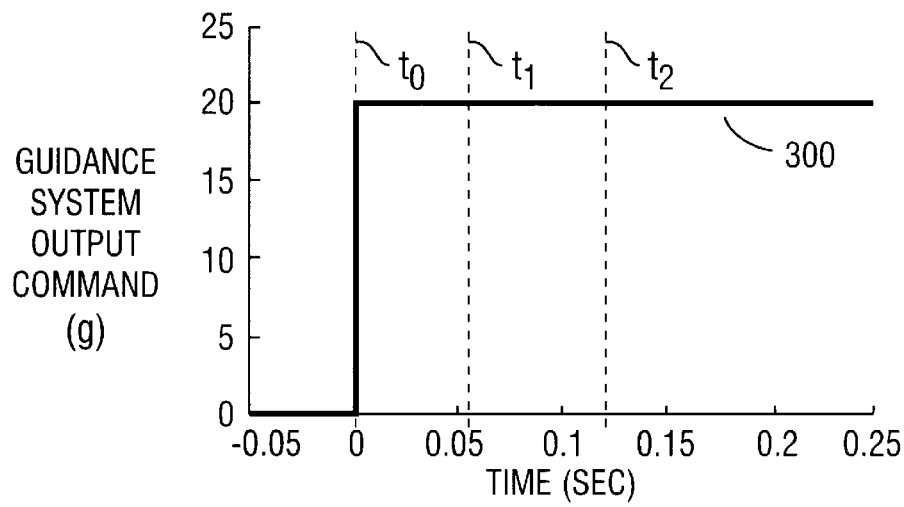
FIGS. 4A through 4C illustrates a conventional control scheme employing an aft (fin) control device.
Figure 4B:
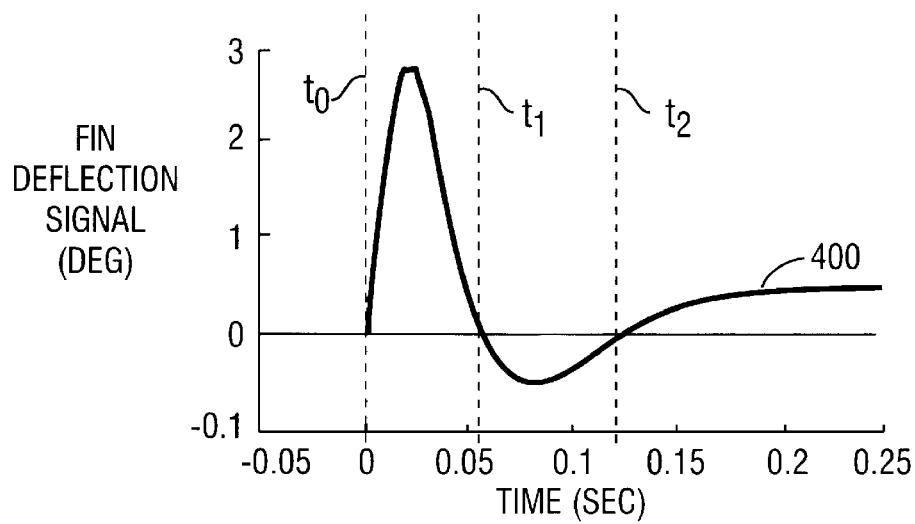
Figure 4C:
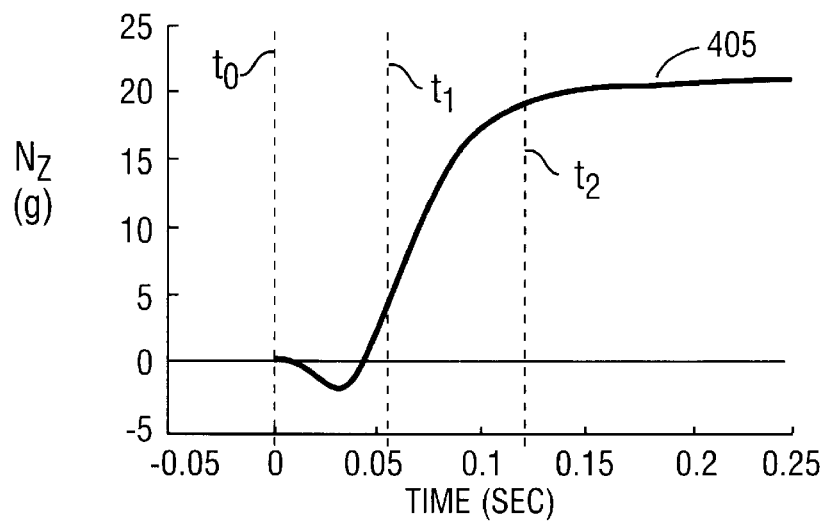
Figure 5:
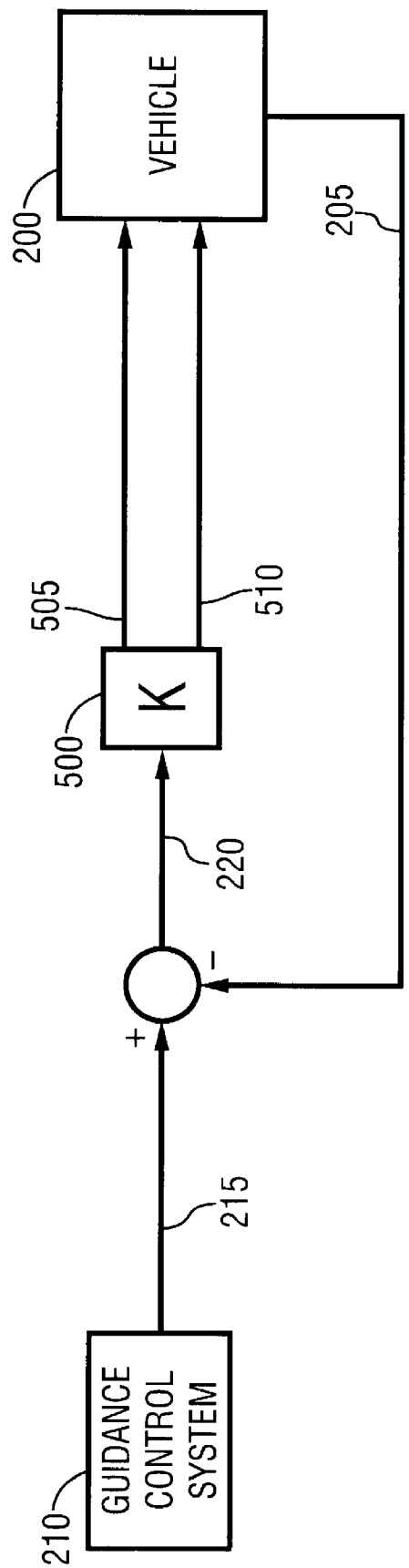
FIG. 5 is a block diagram of a missile control system that uses both forward (thruster) and aft (fin) control devices.
Figure 6A:
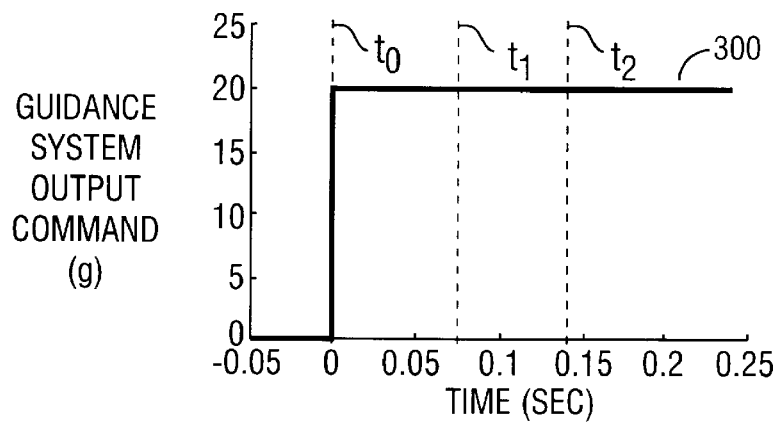
FIGS. 6A through 6D illustrates a conventional dual-control architecture for a missile having forward (thruster) and aft (fin) control devices.
Figure 6B:
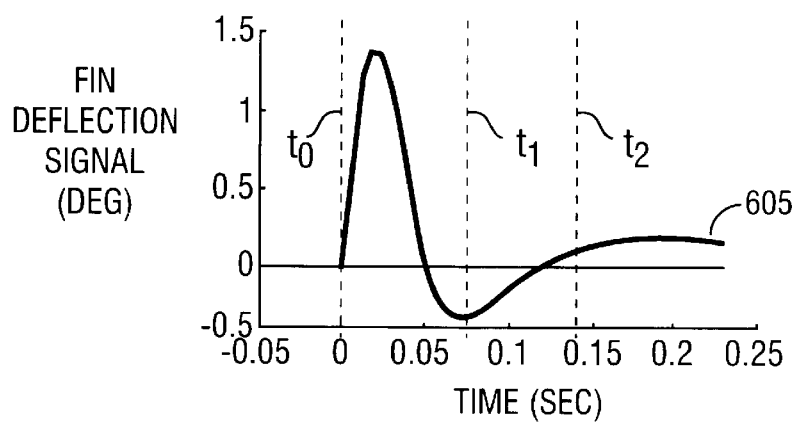
Figure 6C:
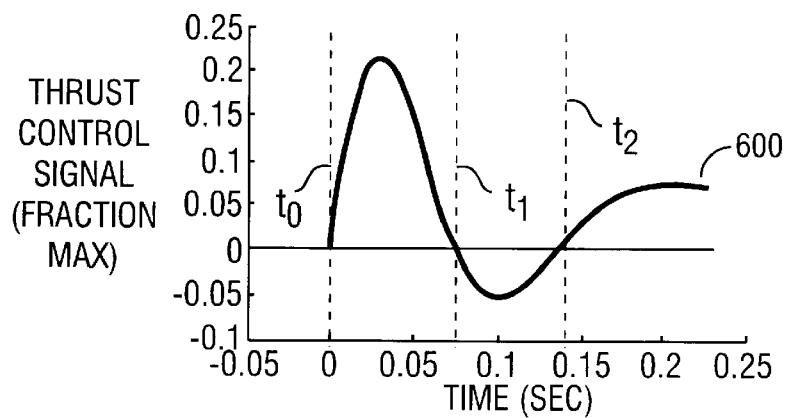
Figure 6D:
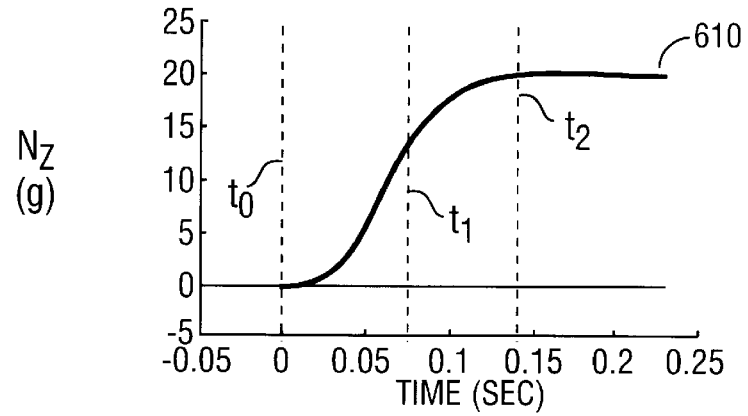

Behavior of a dual-control system in accordance with the invention is shown in FIGS. 7A through 7D. In response to a command signal 300 from the guidance control system 210 for a step increase in acceleration in the positive z-direction, the missile's autopilot controller 500 generates a thruster control signal (505 and 700) and a fin control signal (510 and 705) to effect the maneuver. Signal trace 710 represents the missile's measured (from the inertial measurement system, corresponding to signal 205) transverse acceleration response $N_z$ to the commanded maneuver, where $N_z$ is described above with respect to FIG. 3A through 3C.

FIGS. 7E through 7H illustrates the operation of the control strategy. They show a top-down ("bird's-ee") view of a missile 100 at four different points, moving from the bottom right of the page to the top left, as it changes course by a method in accordance with the invention.

Figure 7A:
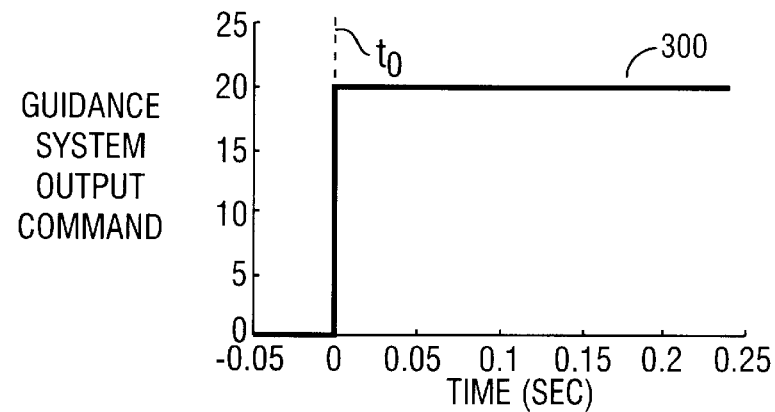
FIGS. 7A through 7D illustrate a dual-control scheme in accordance with the invention for a missile having forward thrusters and aft fin control devices.
Figure 7B:
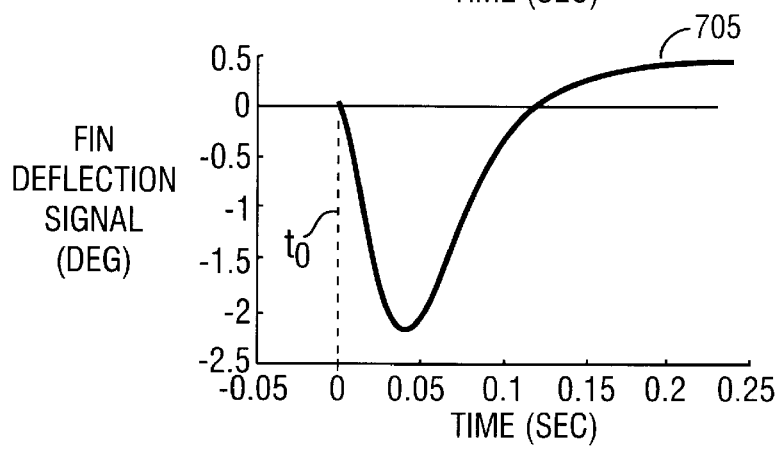
Figure 7C:
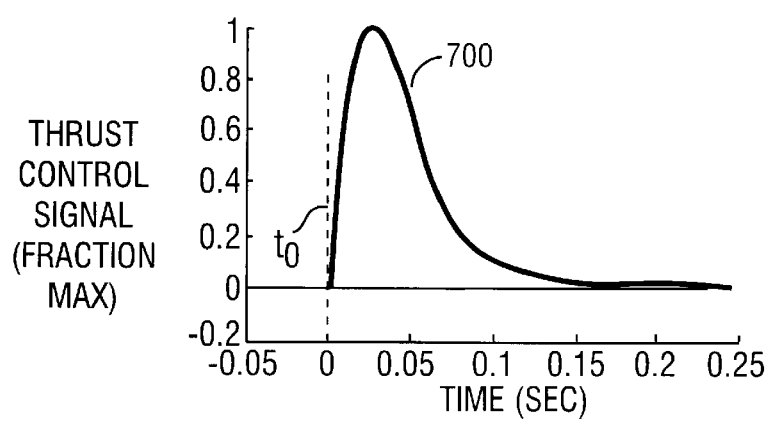
Figure 7D:
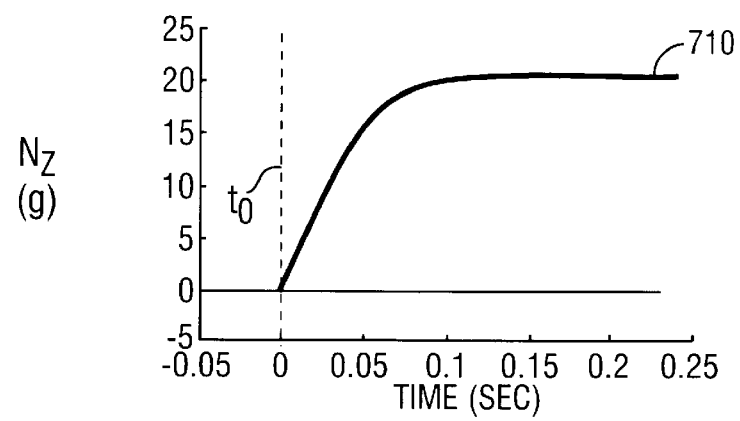
Figure 7H:
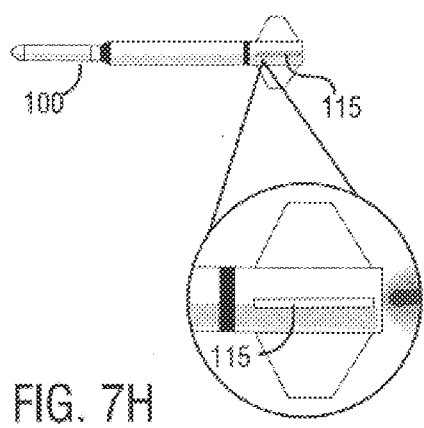
FIGS. 7E through 7H are successive top-down views of a missile making a course change under such a control scheme.
Figure 7G:
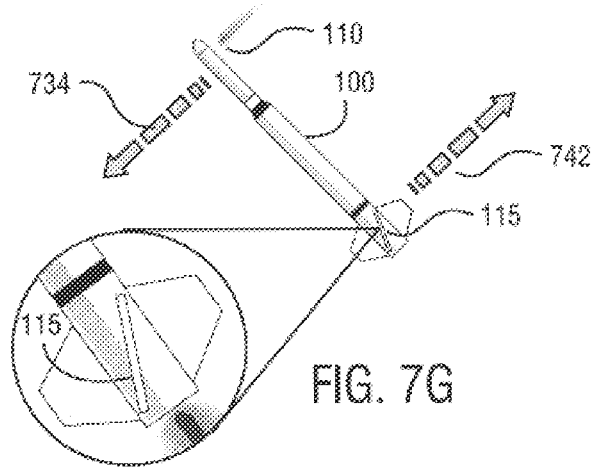
Figure 7F:
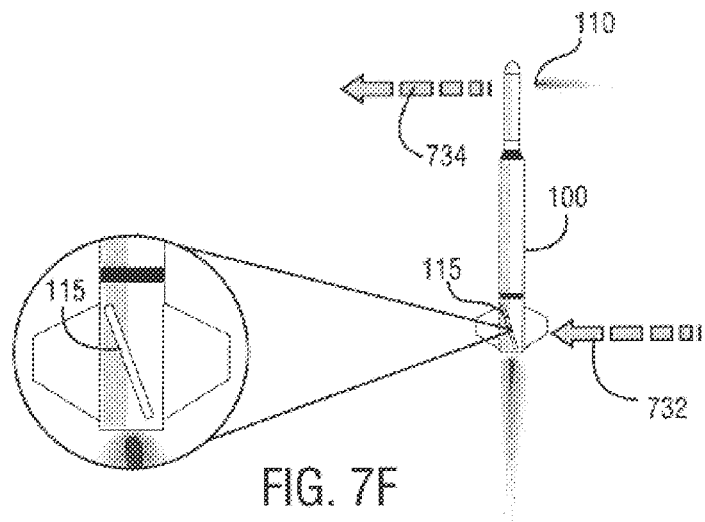
Figure 7E:
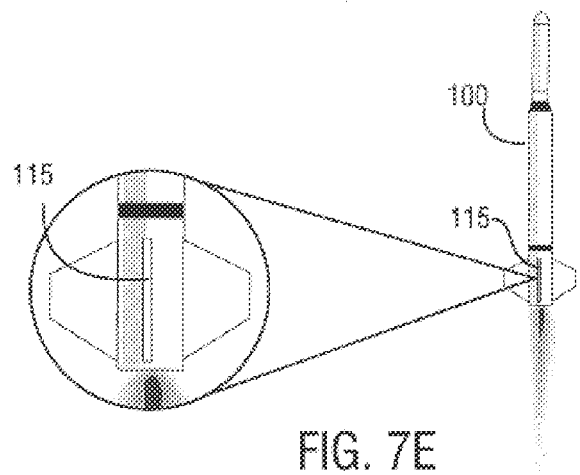

In FIG. 7E, the missile 100 is flying in a direction referred to here as "north," with its tail fins 115 aligned essentially parallel with the body of the missile. If the nose of the missile were the 12 o'clock position on a clock, and the aft end were at the 6 o'clock position, then the tail fins would be in a 12-to-6 position relative to the body of the missile. (Of course, one or more of the tail fins 115 in an actual missile may not be aligned at exactly a 12-to-6 position, but may instead be "trimmed" to take the wind and other aerodynamic forces into account. The same is true of all of the different fin positions described in this example.)

In FIG. 7F, one or more tail fins 115 (e.g., two tail fins on opposite sides of the missile 100, depending on the configuration and roll orientation of the missile) are rotated toward what is shown as approximately an 11-to-5 position relative to the body of the missile 100. The resulting aerodynamic force on the right side of the aft end of the missile 100 pushes that end in a westerly direction, as indicated by the arrow 732. In addition, a forward thruster 110 is operated to push the nose of the missile 100 in the same westerly direction as well, as indicated by the arrow 734. The force of the thruster 110, however, is applied with a greater magnitude or at a greater rate so that it also causes a rotation of the body of the missile 100. Thus, the entire missile 100 is both pushed toward the west and rotated in what is shown as a counter-clockwise direction by the combined action of the tail fin 115 and the thruster 110.

In FIG. 7G, the positions of the tail fins 115 are reversed so that they are rotated toward what is shown as approximately a 1-to-7 position relative to the body of the missile 100. The resulting aerodynamic force on the left side of the aft end of the missile 100 pushes that end, this time in a direction generally opposite that of the thruster 110, as shown by the arrow 742. At the same time, the forward thruster 110 is still pushing the nose of the missile 100 in the same direction (relative to the body of the missile) as it was before, as shown by the arrow 734. The overall effect of these forces is that the body of the missile 100 is rotated in an even more pronounced manner in what is depicted as a counterclockwise direction.

In FIG. 7H, when the missile 100 has achieved the desired westerly course (possibly after correction for overshoot or undershoot), the tail fins 115 are returned to approximately a 12-to-6 position relative to the body of the missile. The missile 100 has not only been rotated to a westerly course, but it has also been advantageously moved in the desired westerly direction during the manuever.

It is an important distinction in the inventive control strategy that the aft fin control command 705, during the early portion of the maneuver, is in a direction OPPOSITE that conventionally used for the maneuver. (If the forward control system is unable to apply a significant enough moment, the fins may briefly be used to augment the thruster moment and then be used as a force generating device at low angles of attack). After this initial movement, the fins are deflected in a direction conventional for the maneuver; compare 705 with 400 and 605. In cooperation with the aft fin control, forward thruster control is applied in the direction expected for the maneuver; compare 700 with 305 and 600.

The invention takes advantage of the physical phenomena that, although the forces generated by the forward and aft control devices are an order of magnitude less than the aerodynamic forces available at high angles of attack, at low angles of attack control device generated forces are the significant forces contributing to the commanded maneuver. As a hypothetical example, suppose that a missile 100 is in flight when the guidance system 210 sends a dynamic response command signal 215 to the autopilot controller 500 indicating that the missile's nose should be moved downward in the positive z-irection. In accordance with the inventive control strategy, the aft control fins 115 are first deflected to push the aft end of the missile downward (i.e., opposite the direction traditionally expected for a positive z-direction maneuver) while the forward thrusters 110 are also fired to push the nose of the missile in the positive z-direction. The key is that the missile's nose is moving more rapidly in the positive z-irection than its aft end. This, in turn, is a result of the force and moment generated by the rapid acting thrusters.

As the vehicle begins to rotate, increasing the aerodynamic force on the missile body due to increasing angle of attack, the fins are deflected to take over as the primary moment generating device while the use of the forward thrusters is reduced to conserve their limited propulsive fuel resources. When the fins are being used as the primary moment generating device, they are deflected in the expected (i.e., conventional) direction, that is, to generate a force in a direction opposite the maneuver. Thus, in the initial stages of the maneuver fins are primarily used as a force generating device while in the maneuver's later stages they are primarily used as a moment generating device. The manner in which the fins are transitioned from a force generating device, where they generate a moment that opposes the maneuver, to a moment generating device, where they generate a force that opposes the maneuver, is done in a manner to provide the desired dynamic response.

As would be known to those of ordinary skill in the field, the manner in which this control surface transition is accomplished to provide the desired dynamic response is a function of the missile's specific design and would include, for instance, the amount of available control force from the forward and aft control devices, the vehicles aerodynamic characteristics, and the missile's flight condition (velocity, altitude, etc.).

Figure 8A:
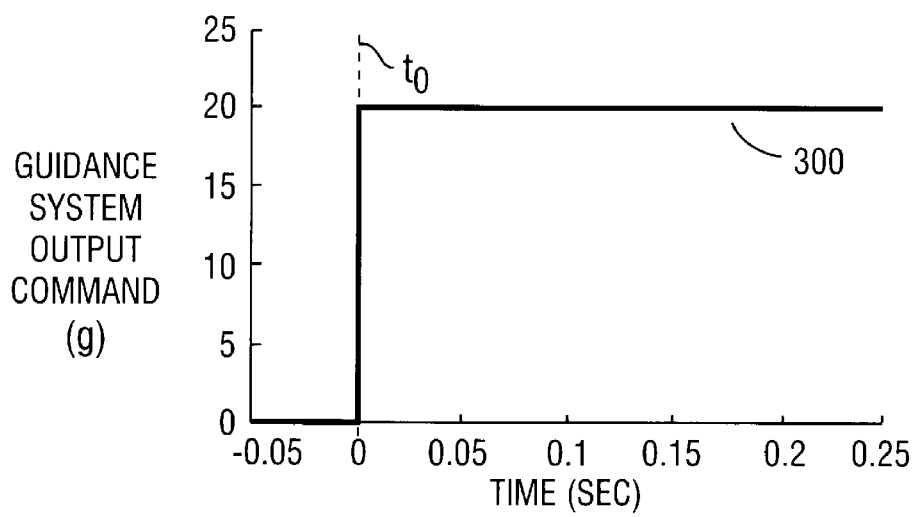
FIGS. 8A through 8C illustrates the difference between forward and aft control signals of conventional missile control schemes, those of an intuitive dual-control scheme, and those control signals generated in accordance with the invention.
Figure 8B:
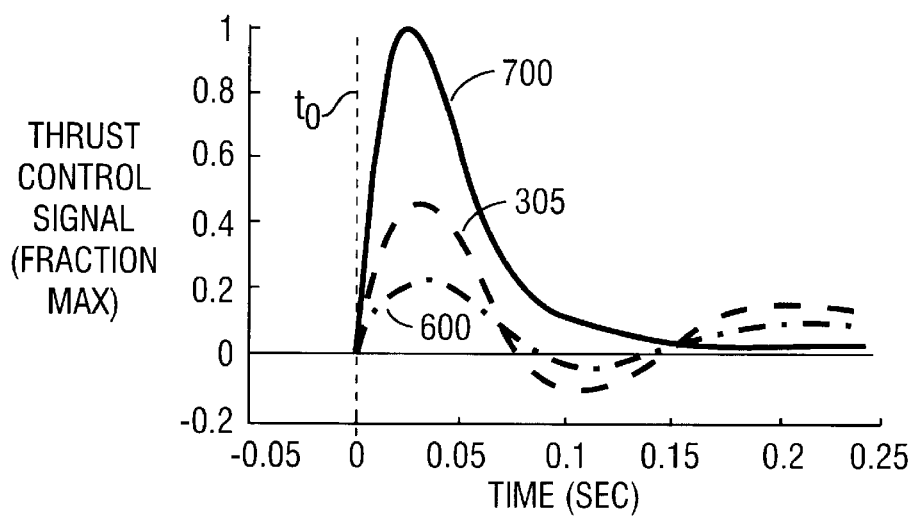
Figure 8C:
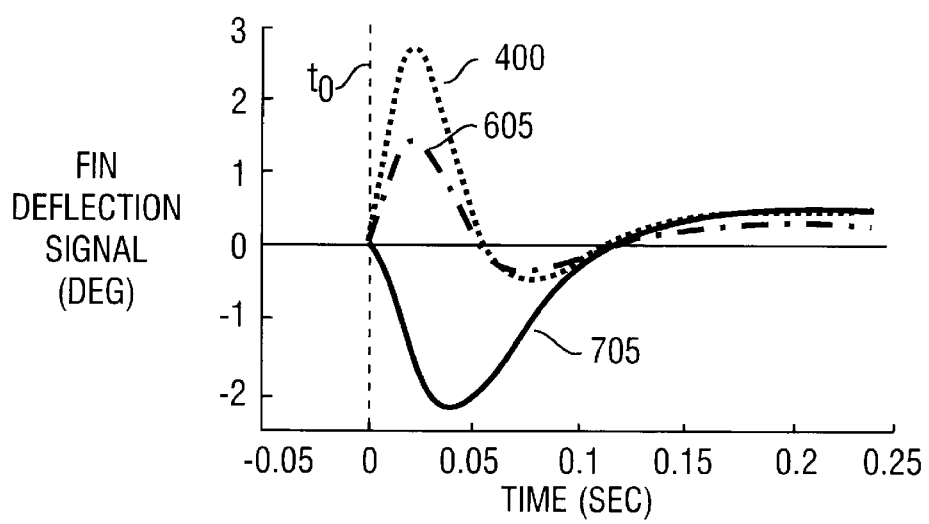
Figure 9A:
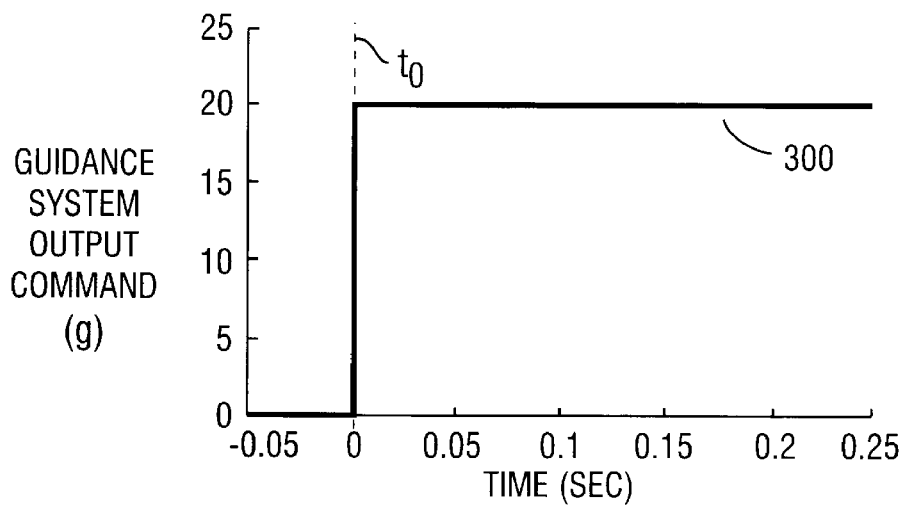
FIGS. 9A and 9B illustrates the difference in missile responses between conventional missile control schemes, those of an intuitive dual-control scheme, and the response generated by a dual-control scheme in accordance with the invention.
Figure 9B:
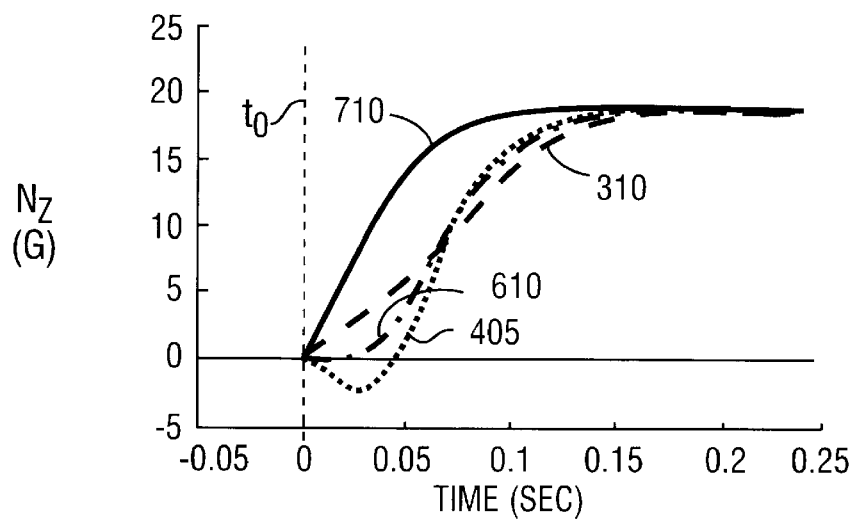

A comparison of control signal strategies highlights the novelty of the instant approach to improving missile maneuverability. FIGS. 8A through 8C compare[s] the autopilot controller output for a forward control strategy only (305 [300]), an aft control strategy only (400), an intuitive dual-control strategy (600 and 605), and a dual-control scheme in accordance with the invention (700 and 705). A similar comparison of missile acceleration profiles, shown in [FIG. 9,] FIGS. 9A and 9B, highlights the advantage of the inventive approach.

It will be appreciated by one of ordinary skill in the field that the performance of any vehicle making use of the inventive dual-control strategy can be monitored via vehicle telemetry. This allows a convenient method of evaluating the controllers effectiveness in a specific implementation. Alternatively, vehicle telemetry offers a means of determining if a vehicle is using the inventive control strategy.

5.2 Improved Divert Capability of the Inventive Control Strategy

The purpose of an interceptor missile is to intercept or "kill" an enemy missile (even when the enemy missile is executing high-g evasive maneuvers). This, in turn, requires an interceptor missile be able to translate laterally as quickly as possible. The maximum lateral distance a missile can translate in a specified period of time, defined in an inertial reference frame, is known as the missile's divert capability.

A key operational benefit of the inventive dual-control strategy is a dramatically improved missile divert capability. To illustrate this important improvement, consider the situation in which an interceptor missile approaches a high speed target which executes an evasive maneuver requiring the interceptor to counter with its maximum divert capability.

Figure 10:
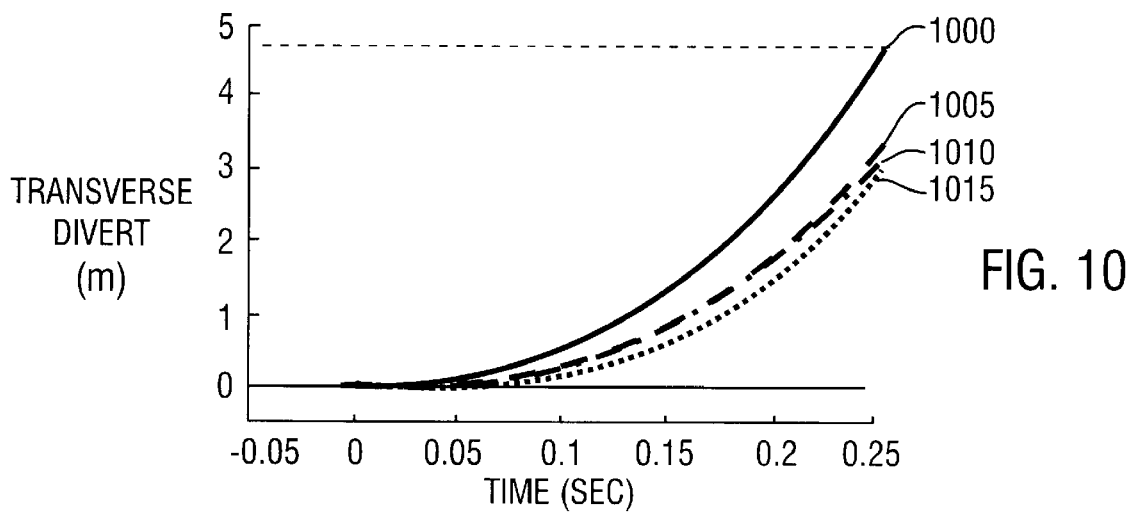
FIG. 10 illustrates the improved missile divert capability of the inventive dual-control strategy over conventional fin isolated or thruster isolated control strategies and an intuitive dual-control scheme.

FIG. 10 shows the simulated divert capability (in response to a 20 g command from the interceptor's guidance control system) for a missile with the following configuration: traveling at mach 3, sea level altitude, weight of 48 Kilograms (Kg), length of 2.64 meters, diameter of 16.5 centimeters (cm), aft fin span of 11.4 cm, and a divert thrust of 3114 Newtons. As shown, a 20 g guidance command produces a 4.7 meter divert 1000 using the inventive control strategy in a relevant time frame of 0.25 seconds. This compares to a 3.4 meter divert 1005 with isolated thruster control, a 3.2 meter divert 1010 with the intuitive dual-control approach, and a 3.1 meter divert 1015 with the isolated fin control. The resulting divert capability can be directly correlated to increased capability against maneuverable targets or used to offset guidance sensor uncertainties.

5.3 Fuzzy-Logic Embodiment of the Inventive Control Strategy

This section contains, in substantial part, a paper presented by the inventor at the 1994 IEEE International Symposium on Intelligent Control in Columbus, Ohio, USA on Aug. 17, 1994 and describes a controller in accordance with the invention implemented using fuzzy logic techniques.

Fuzzy logic has the ability to produce a nonlinear napping from conditions in error space to actions in control command space. This property translates to the ability to improve response time to a step input as exemplified with a two degree of freedom, pitch plane autopilot for a supersonic missile. More notably, it is further demonstrated that the fuzzy logic methodology can address a set of performance indices which can be ambiguously stated but are intuitively important. An example of a missile controlled simultaneously with two competitive control mechanisms is used to illustrate where this advantage is relevant and desirable.

5.3(a) Fuzzy Logic

Fuzzy logic is a mathematical discipline based on fuzzy set theory which allows for degrees of truth and falseness. Fuzzy logic in a controller maps a set of inputs called antecedents to a set of control command outputs called consequents which will appropriately actuate devices to translate the system to the desired state. Because of the multi-valued nature of fuzzy logic, the values of the system states can be categorically described by linguistic variables which maintain the intuitive knowledge or feel the engineer has for the system. For example, rates may be described as "positive fast" or "negative slow" and control actions may be classified as "negative large" or "positive medium," etc. What has been criticized by some as ad-hoc tuning is in truth a minimization technique where the engineer has conceptualized and applied an ambiguous set of performance indices.

Figure 11:
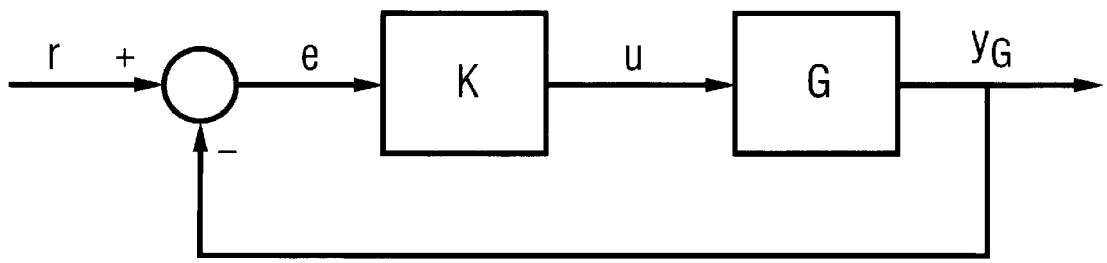
FIG. 11 shows a block diagram for a generalized control system for the purposes of describing a fuzzy logic based controller implemented in accordance with the invention.

Consider the generalized feedback control system shown in FIG. 11 where G is the system plant (equivalent to vehicle 200), $y_G$ is the vector of measured responses (equivalent to the measured dynamic response 205), r is the vector of input command levels (equivalent to the commanded dynamic response 215), the vector e is the difference between the desired command levels and the measured responses or error state (equivalent to error signal 220), K is the stabilizing controller (equivalent to the autopilot controller 225), and u is the vector of commands for the control actuation system (equivalent to the composite control signal comprising forward and aft control commands, 505 and 510 respectively). If K is chosen to be based on fuzzy logic, the error state e at a discrete time point is correlated with the desired controller command u in three steps: 1) Fuzzification, 2) Rule Evaluation, and 3) Defuzzification.

Figure 12:
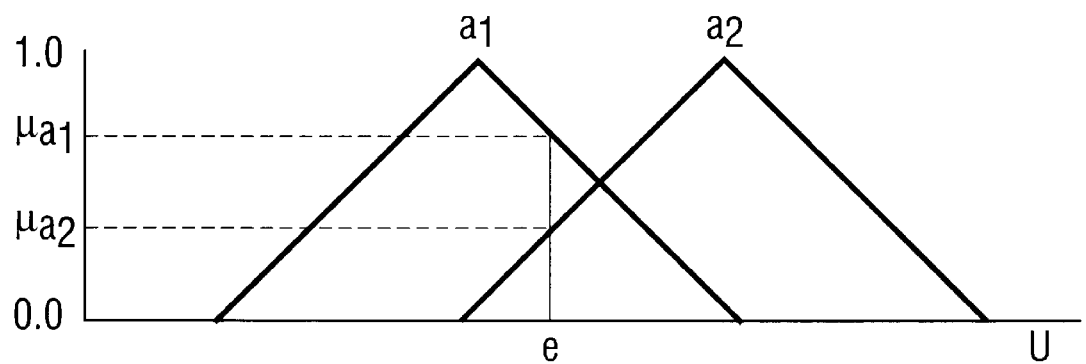
FIG. 12 shows a graphical representation of a triangular membership fuzzy-rule.

Fuzzification is the process of characterizing each error state being input to the controller over a range of values called the universe of discourse, U. It is helpful for tuning purposes to normalize each U by a typical maximum value of its associated error state. Each universe of discourse is divided into multiple overlapping subsets defined by a membership function and labeled by a linguistic variable such as "positive large." A distinct or "crisp" value of an error state may belong to more than one subset on U and the degree of membership, $\mu$, is determined by the membership function. The degree of membership is defined over the interval from [0,1] as:

$$\mu_{a_n} = {}_n(e)$$

where $a_n$ denotes the nth membership function such as "negative slow". A simple example of the fuzzification process is illustrated in FIG. 12. Triangular membership functions are used for this example because of their favorable properties. (See, for example, Liu, K. and Lewis, F. L., "Some Issues About Fuzzy Logic Control" Proceedings of the 32nd Conference on Decision and Control, December 1993, pp. 1743–1748.)

The next step in mapping the error signal to the control command is rule evaluation. The adopted sign convention and dynamical relationship between interacting error states and output controller commands are reflected in these rules. For each possible combination of membership classes (one from each universe of discourse), there is a rule defining which output membership function is activated. For two or more error states, the fuzzy control rules have the form:

$$\text{If}(e_1 \in a_{i,1}) \text{ and}(e_2 \in b_{1,2}) \text{and} \ldots \text{Then}(\mu \in c_i)$$

where $e_1$ and $e_2$ are inputs to the controller, a, b, and c are linguistic or fuzzy labels, $\mu$ is the output control and the subscript i denotes the rule number.

The final step is to defuzzify the aggregate of activated membership functions pertaining to the output control command. Given values for the error states in the evaluated rule, the degree to which u belongs to the output linguistic variable $c_i$ is:

$$\omega_i = \min(\mu_a{}^{i,1}, \mu_b{}^{i,1}, \ldots)$$

where $\omega_i$ is the degree of fulfillment of the rule. The most common method of determining the discrete output value for each control in the vector u is by calculating the centroid of where its membership function values are acting along the output control's universe of discourse. The output value is given by:

$$u = \frac{\sum_{i=1}^{n} \omega_i c_i}{\sum_{i=1}^{n} \omega_i}$$

where n is the number of rules.

Thus a crisp input value is mapped to a crisp output value through this three step process. It has been shown that any arbitrary mapping from an input to an output can take place if a nonlinear function (such as the minimum fixation) is used in the correlation process. (See. Rumelhart, D. E., McClelland, J. L., and the PDP Research Group, Parallel Distributed Processing, Vol. 1: Foundations, MIT Press, Cambridge, Mass., 1986, pp. 318–362.)

Figure 13:
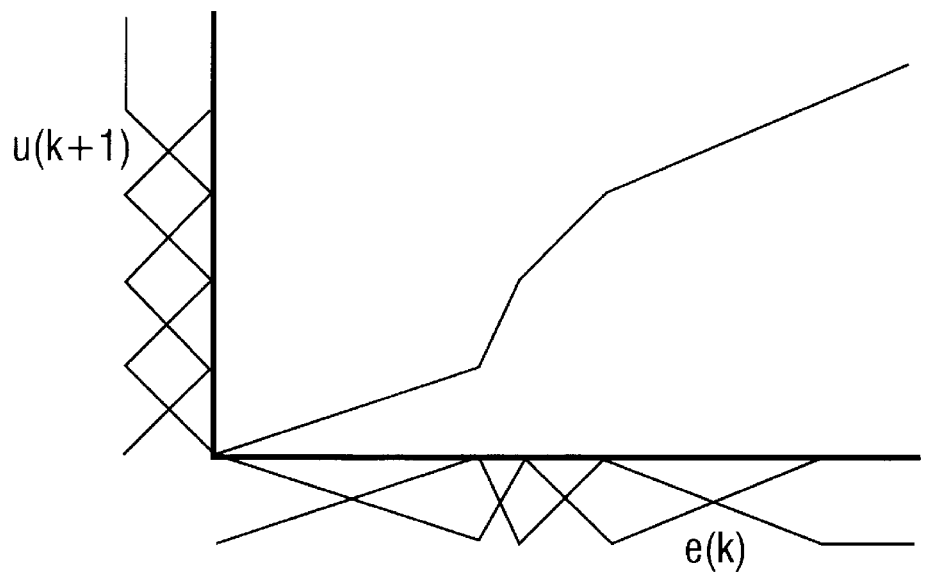
FIG. 13 shows the nonlinear variation between error and control signals in an illustrative fuzzy logic implementation of the inventive control strategy.

A controller K defined by fuzzy logic is not dependent upon the last value of the provided command. If a single-input, single-output system is examined at a discrete time point, a linear control correlation between e(k) and u(k+1) can be obtained if the membership functions of the antecedents and the consequents are evenly spaced. However, the mapping can be made nonlinear by specifying either the antecedent or consequent spacing to be nonuniform as illustrated in FIG. 13. For a multiple input system, the mapping can be proven to always be nonlinear due to the nonlinear function required for the defuzzification process. The minimum function was used in this example.

The nonlinear attribute of the fuzzy logic controller allows the response shape to be tailored throughout the range of command levels. A response could be designed to be sluggish for low command/noise levels, conservative for nominal command levels, and exaggerated at high command levels (where efficient use of control is not the primary concern). The nonlinear feature also allows the capability to accommodate without limiting assumption system nonlinearities. Examples of nonlinearities pertinent to the presented example would be impulsive control and high angle of attack aerodynamics.

5.3(b) Example Application: Missile Autopilot

Figure 1:
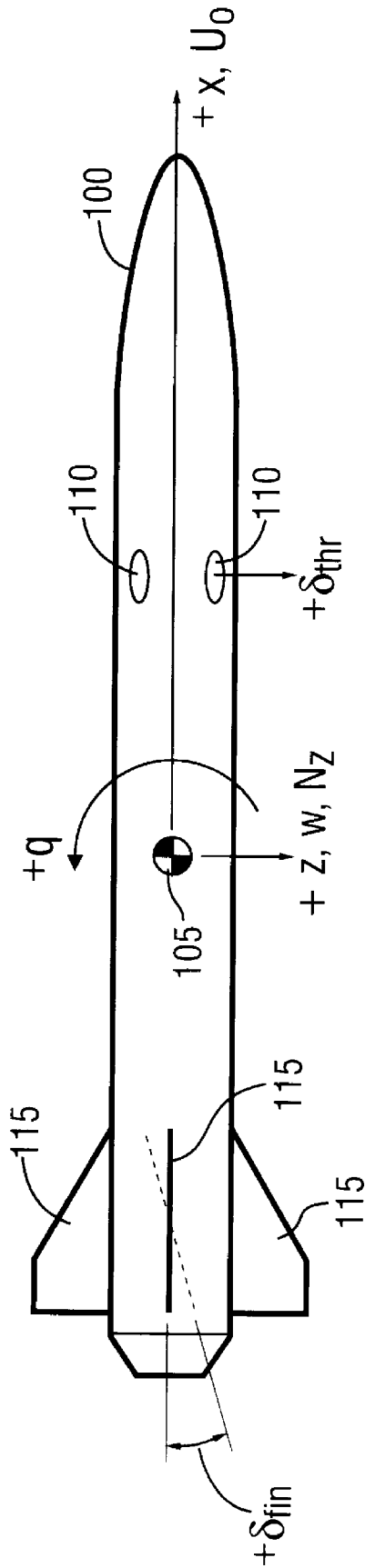
FIG. 1 is a diagram of a missile system showing the missile's center of gravity and a conventional right-hand coordinate system.
Figure 2:
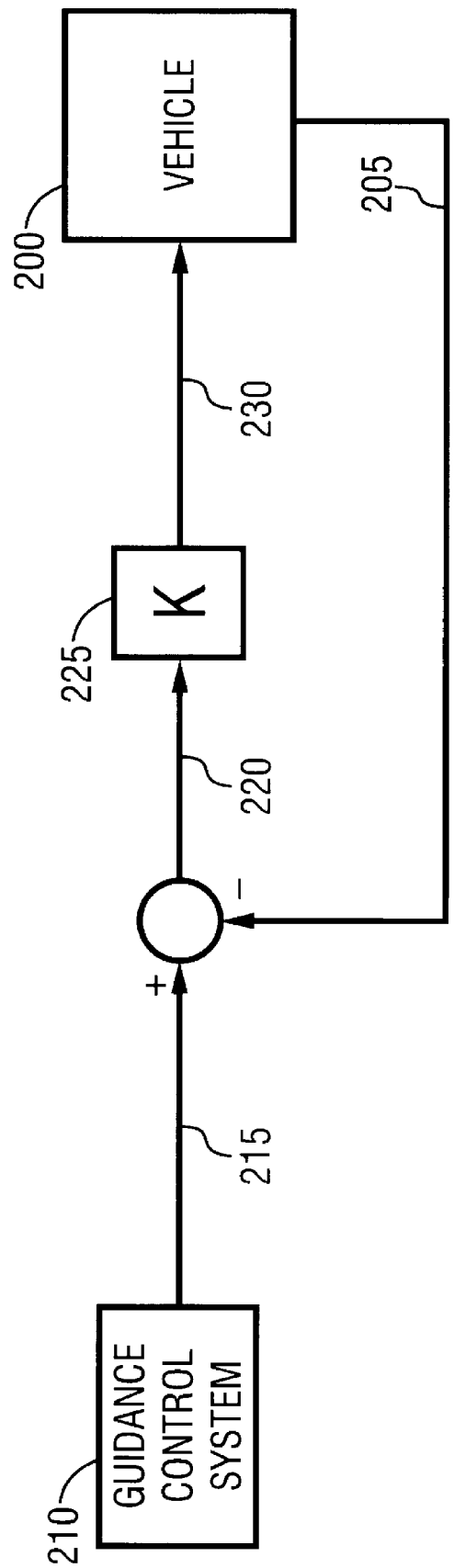
FIG. 2 is a block diagram of a conventional missile control system employing a single (either forward or aft) control device.

An example of an application is a missile with both aft fin control and forward propulsive control with an autopilot simultaneously utilizing and controlling both devices. (See also FIG. 1 and FIG. 11.) The example vehicle is a supersonic, highly maneuverable missile having a length of thirteen feet, a diameter of one foot and a weight of three hundred pounds. (For a detailed development of the example vehicle system see, Schroeder, W. K., *Parameter Estimation Using A Back Propagation Neural Network*, Masters Thesis, University of Texas at Arlington, May, 1990.) Control of the vehicle is achieved by actuator-driven aft movable fins and forward impulsive thrusters. The thrusters provide an impulsive force of 1000 pounds but are modeled with a linear force variation for this example. The center-of-gravity position is chosen to yield a stable vehicle and an adequate moment arm for both aft fin and forward thruster control implementations. The mechanisms were sized and placed to give approximately the same divert capability for a half second maneuver.

The summation of forces and moments for the symmetric, non-rolling vehicle propelled at a constant forward velocity provides the following state space equations of motion:

$$\begin{bmatrix} \dot{w} \\ \dot{q} \\ \dot{x} \\ \dot{\delta}_f \end{bmatrix} = \begin{bmatrix} Z_w & U_0 & 0 & Z_{\delta_f} \\ M_w & M_q & 0 & M_{\delta_f} \\ 0 & 0 & -2\zeta\omega_n^2 & -\omega_n^2 \\ 0 & 0 & 1 & 0 \end{bmatrix} \begin{bmatrix} w \\ q \\ x \\ \delta \end{bmatrix} + \begin{bmatrix} 0 & Z_{\delta_t} \\ 0 & M_{\delta_t} \\ \omega_n^2 & 0 \\ 0 & 0 \end{bmatrix} \begin{bmatrix} \delta_{f_c} \\ \delta_{t_c} \end{bmatrix}$$

$$\begin{bmatrix} N_z \\ q \\ \delta_f \\ \delta_t \end{bmatrix} = \begin{bmatrix} \frac{Z_w}{g} & 0 & 0 & \frac{Z_{\delta_f}}{g} \\ 0 & 1 & 0 & 0 \\ 0 & 0 & 0 & 1 \\ 0 & 0 & 0 & 0 \end{bmatrix} \begin{bmatrix} w \\ q \\ x \\ \delta \end{bmatrix} + \begin{bmatrix} 0 & \frac{Z_{\delta_t}}{g} \\ 0 & 0 \\ 0 & 0 \\ 0 & 1 \end{bmatrix} \begin{bmatrix} \delta_{f_c} \\ \delta_{t_c} \end{bmatrix}$$

where q is the pitch rate, w is the transverse velocity, and $N_z$ is the transverse acceleration load factor (See Table 1.) Fin and propulsive control commands are denoted by $\delta_{f_c}$ and $\delta_{t_c}$ respectively, whereas the actual increments of the respective control are given by $\delta_f$ and $\delta_t$. Terms $\omega_n$ and $\zeta$ refer to the natural frequency and damping ratio of the second-order fin actuation system. See Table 2 for definitions and values of dimensionalized aerodynamic stability derivatives for a Mach 3.0 ($U_0$=2985.3 ft/s) flight.

TABLE 2

Time-Invariant Coefficients at Mach 3

| Coefficient | Value | Definition of Stability Derivative |
|---|---|---|
| $M_w$ | -0.0244 | $\partial$(pitching moment)/$\partial$(transverse velocity) |
| $Z_w$ | -0.7858 | $\partial$(normal force)/$\partial$(transverse velocity) |
| $M_q$ | -0.6031 | $\partial$(pitching moment)/$\partial$(pitch rate) |
| $M_{\delta f}$ | -381.01 | $\partial$(pitching moment)/$\partial$(fin deflection) |
| $Z_{\delta f}$ | -1155.76 | $\partial$(normal force)/$\partial$(fin deflection) |
| $M_{\delta t}$ | -29.929 | $\partial$(pitching moment)/$\partial$(thruster force) |
| $Z_{\delta t}$ | 107.247 | $\partial$(normal force)/$\partial$(thruster force) |

The following relationships complete the connection to the block diagram previously provided in FIG. 11.

$$r = \begin{bmatrix} N_{z_{cmd}} \\ q_{trim} \end{bmatrix}, u = \begin{bmatrix} \delta_{f_c} \\ \delta_{t_c} \end{bmatrix}, y_G = \begin{bmatrix} N_z \\ q \end{bmatrix}.$$

The error states (or antecedents) for the fuzzy logic controller are the difference between the desired load factor and the measured $N_z$ response and the difference between the trim pitch rate and the measured pitch rate. The trim value of the pitch rate can be implied from the $N_z$ command level since the dynamics are so highly coupled. The antecedents are fed into separate membership functions for both the fins and the thrusters. The control vector elements of u (or consequents) are a combination of commands to the aft fins and forward thrusters.

An important incentive for simultaneously using both control mechanisms is an improvement in response time, and subsequent divert capability, a given missile configuration can achieve. The amount of transverse acceleration the missile must be capable of in an intercept endgame engagement is reduced by the improvement in response time squared. The controller response could be improved or degraded by simply altering its effective moment arm on the missile. This could be achieved by shifting the center-of-gravity which happens throughout the flight, or by moving the physical location of the control device. The longer the moment arm, the more rapid the control response. Due to physical constraints, the control mechanism locations are defined very early in the design process. Thus, the obvious remaining choice for increasing the moment applied to the vehicle is to use both control implementations simultaneously.

Dual-control is a difficult problem for conventional analysis techniques. Its multiple-input, multiple-output characteristics preclude single-input, single-output methods such as Bode, root locus, etc. Because these control mechanisms render the identical task (provide a moment to the vehicle), they are competitive. Therefore, a performance index is necessary to allocate the use of each device. The advantage fuzzy logic can provide through its designable nonlinear variation between u and e is the ability to address conflicting performance indices (however ambiguous). For example:
1. Aft fin control is relatively cheap.
2. Forward impulsive thruster control has severely limited endurance and therefore is expensive.
3. Acceleration response ($N_z$) is a premium.
4. Divert response (proportional to the double integral of $N_z$) is a premium.

Propulsive control is admirable in terms of response because it provides a control force in the direction of the maneuver as opposed to fin control which provides a control force in the opposite direction. However, the discrete nature of thrusters lend themselves to limit cycling. Therefore, at low command levels it is not desired to expend thrusters. Furthermore, when the error is nulled and the vehicle is in trim conditions, the steady state control should be provided by the fins.

Figure 14:
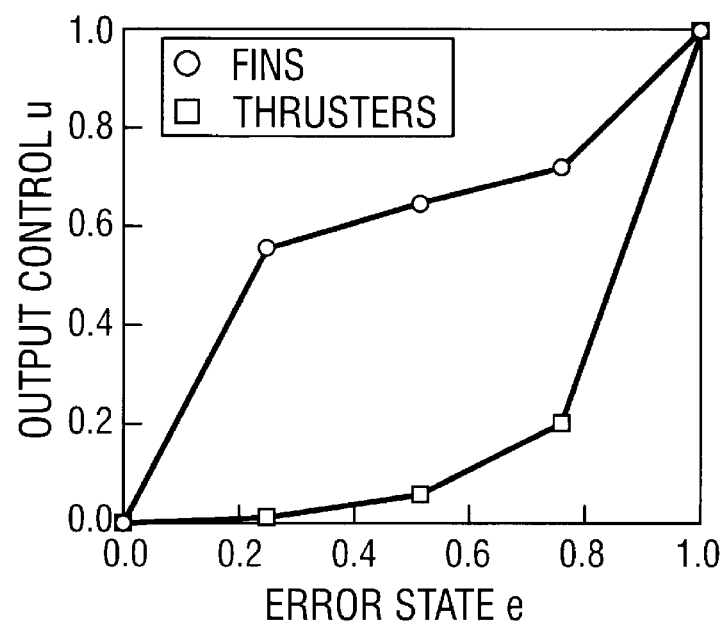
FIG. 14 shows the forward and aft control command signal magnitude shaping employed by a cooperative dual-control system for a fuzzy logic based embodiment of the inventive control strategy.

The key to achieving the desired response goals and satisfying the above performance indices is in the shaping of the command controller signals based on the magnitude of the incoming acceleration command (i.e., the commanded dynamic response). The nonlinear controller variation used to achieve this is shown in FIG. 14. Note that since there is no control output for a zero error input for fuzzy logic control, a steady state error is required to hold trim. The control command is therefore scaled to provide 10 g's.

5.3(c) Analysis and Simulation Results

Figure 15:
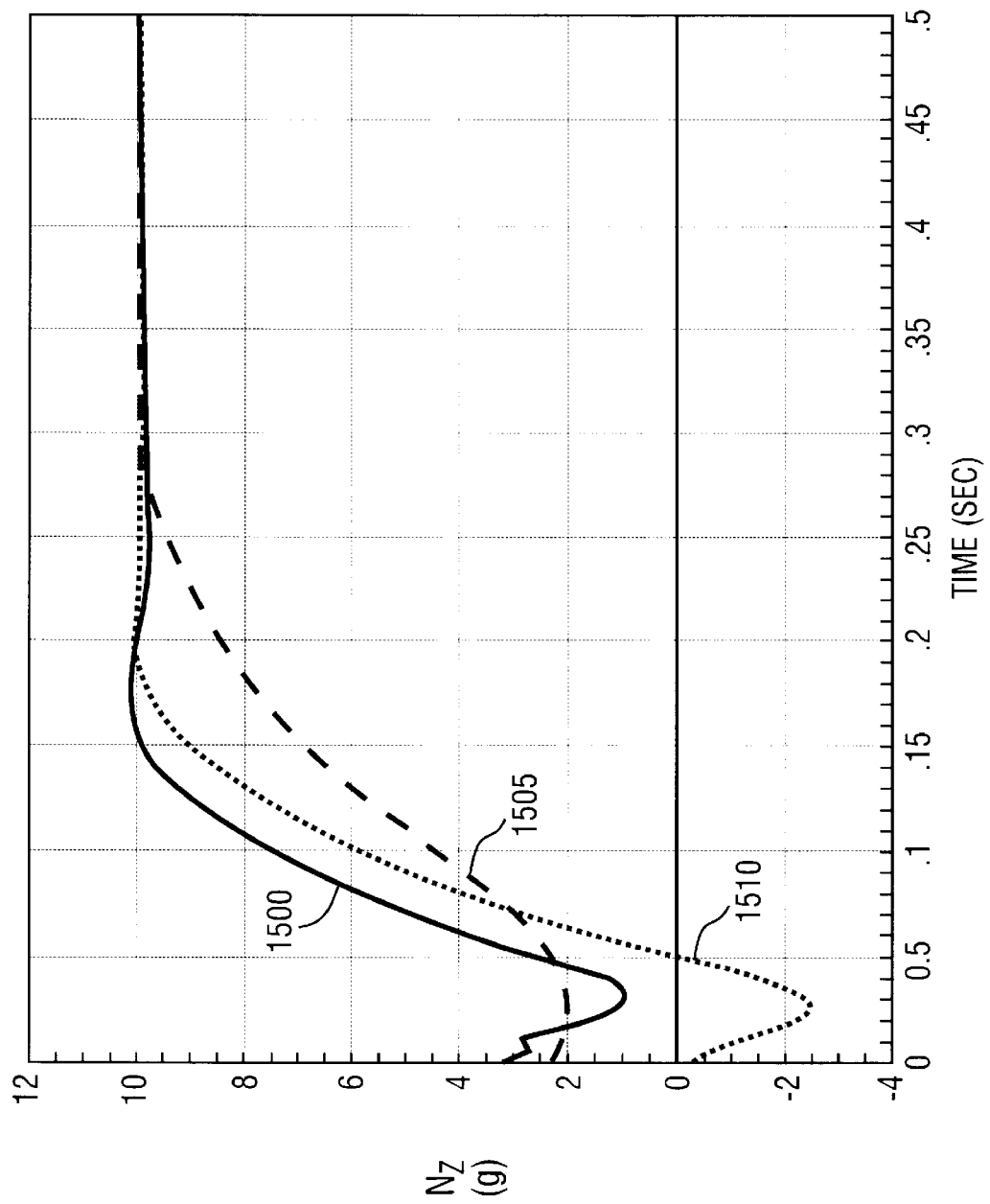
FIG. 15 shows the transverse acceleration (simulated) responses for isolated control mechanisms compared with the response obtained with a cooperative dual-control strategy in accordance with the invention.

The maneuver goal is to reach a desired $N_z$ command level in response to a step input. The desired level is set to 10 g's for the simulation analysis. The criterion of minimal overshoot is chosen for the purpose of comparing responses from the different controllers. This is equivalent to specifing a damping ratio around 0.9 for a second order linear system. The isolated control responses correspond to linear, time-invariant constant gain feedback with the control rates and maximum commands identically bounded. Under these constraints, FIG. 15 shows the transverse acceleration load factor $N_z$ response using a dual-control scheme in accordance with the invention 1500, conventional isolated thruster control 1505, and conventional isolated fin control 1510 mechanisms. It will be understood by those of ordinary skill in the field that a missile's divert capability is proportional to the double intergral of the missile's transverse acceleration load factor. Thus, the dual-control strategy represented by curve 1500 has a larger magnitude divert capability than is possible with either a conventional isolated thruster or conventional isolated fin control technique.

5.4 Additional Enablement Methods

In addition to the fuzzy-logic embodiment described above, which uses a time domain description, the inventive control strategy can also be demonstrated using a frequency analysis technique known as $H_\infty$ (H-infinity) control synthesis. As would be known to those of ordinary skill in the field, $H_\infty$ analysis is a multiple-input, multiple-output, state-space control technique. A key to implementing the inventive control strategy using $H_\infty$ techniques is the shaping of the control command signals in the frequency domain.

An $H_\infty$ controller in accordance with the invention attenuates the use of fins in response to high frequency commanded accelerations, and attenuates the use of the forward thrusters in response to low frequency commanded accelerations. The selection of these specific attenuation frequencies will weight the use of the two control devices and is an iterative process culminating in the device usage defined by the invention.

The definition of high and low frequencies is a function of the missile's configuration, flight condition, and control authority. As a rough generalization, the beginning of the high frequency attenuation of the fins is an order of magnitude greater than the missile's natural frequency but below the frequency of the fin's actuating devices. The frequency below which the forward thruster usage is attenuated is typically on the same order of magnitude as the vehicle's natural frequency.

5.5 Advantages

It is a fundamental purpose of the instant invention to employ a dual-control mechanism that combines forward and aft control techniques cooperatively to dramatically improve the dynamic characteristics (maneuverability) of a missile. A control scheme in accordance with the invention provides the following advantages:
1. Increased missile maneuverability—measured by a missile's divert capability. The beneficial consequences of this advantage include:
   a. Increased volume of defendable air space as defined by altitude and range coordinates (engagement envelope).
   b. Increased capability against more maneuverable air vehicle threats.
   c. Increased capability against air vehicle threats with small radar cross sections.
   d. Decreased performance requirements on (expensive) sensor hardware for identical missile maneuverability as compared to missiles using conventional control strategies.
2. Increased control endurance and efficient use of control. A beneficial consequence of this advantage is the decreased missile weight/cost compared to missiles having identical maneuver capability using conventional control strategies. (Weight is proportional to cost.)

It will be appreciated by those of ordinary skill having the benefit of this disclosure that numerous variations from the foregoing illustration will be possible without departing from the inventive concept described herein. Accordingly, it is the claims set forth below, and not merely the foregoing illustration, which are intended to define the exclusive rights claimed in this application program.

What is claimed is:

1. A control system for a vehicle having a forward portion and an aft portion, said system comprising:
   (a) forward steering means for pushing the forward portion in a direction different from a direction of travel of the vehicle;
   (b) aft steering means for pushing the aft portion in a direction different from said direction of travel; and
   (c) means for controlling the forward steering means and the aft steering means so that (1) both the forward portion and the aft portion of the vehicle are initially pushed substantially toward a new direction of travel, after which (2) the aft portion is pushed in substantially the opposition direction, relative to the vehicle, as the forward portion.

2. The control system of claim 1, wherein the vehicle is a missile.

3. The control system of claim 1, wherein the forward steering means comprises at least one thruster.

4. The control system of claim 1, wherein the aft steering means comprises at least one fin.

5. An autopilot controller for use with a vehicle having (i) a forward portion, (ii) an aft portion, (iii) a forward steering device actuatable in response to control signals, referred to as forward control signals, and (iv) an aft steering device actuatable in response to control signals, referred to as aft control signals, said autopilot controller comprising:

(a) means for generating one or more of said forward control signals causing the forward steering device to force the forward portion nose toward a new direction of travel; and (b) means for generating one or more of said aft control signals causing said aft steering device initially to steer the aft portion substantially toward the new direction of travel, then to steer the aft portion in substantially the opposition direction, relative to the vehicle, as the forward portion.

6. The autopilot controller of claim 5, wherein the vehicle is a missile.

7. The autopilot controller of claim 5, wherein the forward steering device comprises at least one thruster.

8. The autopilot controller of claim 5, wherein the aft steering device comprises at least one fin.

9. A memory device for use with an autopilot controller in a vehicle having (i) a forward portion, (ii) an aft portions (iii) a forward steering device actuatable in response to control signals, referred to as forward control signals, and (iv) an aft steering device actuatable in response to control signals, referred to as aft control signals, said memory device encoding instructions executable by the autopilot controller:

(a) to generate one or more of said forward control signals causing the forward steering device to steer the forward portion toward a new direction of travel; and (b) to generate one or more of said aft control signals causing said aft steering device initially to steer the aft portion substantially toward the new direction of travel, then to steer the aft portion in substantially the opposition direction relative to the vehicle, as the forward portion.

10. The memory device of claim 9, wherein the vehicle is a missile.

11. The memory device of claim 9, wherein the forward steering device comprises at least one thruster.

12. The memory device of claim 9, wherein the aft steering device comprises at least one fin.

13. A memory device for use with an autopilot controller in a vehicle having a forward portion, an aft portion, a longitudinal axis, and a control system actuatable by control signals, said memory device encoding instructions executable by the autopilot controller to generate one or more control signals causing the control system:

(a) initially to push both the forward portion and the aft portion of the vehicle sideways toward a new direction of travel; and (b) subsequently to push the aft portion of the vehicle in a direction substantially opposite the direction in which the forward portion is being pushed.

14. The memory device of claim 13, wherein the vehicle is a missile.

15. The memory device of claim 13, wherein the forward steering device comprises at least one thruster.

16. The memory device of claim 13, wherein the aft steering device comprises at least one fin.

* * * * *